UNITED STATES PATENT OFFICE.

GEORGE B. BURNHAM, OF BERKELEY, CALIFORNIA.

PROCESS OF OBTAINING POTASSIUM SALTS FROM SALINE WATERS.

1,328,417.     Specification of Letters Patent.     Patented Jan. 20, 1920.

No Drawing.     Application filed July 1, 1918. Serial No. 242,738.

*To all whom it may concern:*

Be it known that I, GEORGE B. BURNHAM, a citizen of the United States, and a resident of Berkeley, county of Alameda, State of California, have invented a certain new and useful Process of Obtaining Potassium Salts from Saline Waters, of which the following is a specification.

The invention relates to a process of recovering potassium salts from solutions containing sodium, potassium, sulfate, chlorid and carbonate ions as the chief ingredients. Solutions of this kind are found in the brine of the alkali lakes of the western United States.

An object of the invention is to provide a process for recovering the various potassium salts in a cheap manner.

The invention possesses other advantageous features, some of which, with the foregoing, will be set forth in the following description where I shall outline in full the process of my invention. I shall describe the process as applied to the brine of Searles Lake in California, but it is to be understood that the process is not limited to this particular brine. Searles Lake brine contains sodium, potassium, sulfate, chlorid and carbonate ions as the chief ingredients. The brine also contains small amounts of bicarbonate and borate ions and traces of numerous other substances. The bicarbonate ions will act similarly to the carbonate ions but neither the bicarbonate or borate react chemically with the potassium, and since both the bicarbonates and borates are present in small quantities, they will crystallize out in the latter part of the process when the concentration of the brine has been greatly increased.

By the process of my invention I am able to employ natural temperatures for evaporation and cooling to cause the crystallization of the potassium salts. I prefer to make use of the temperature variations of winter and summer, but in some instances it may be possible to carry out the process with the difference in temperature between day and night, and if the climatic conditions in temperature are not sufficient, it may be necessary to use artificial variations in temperature.

I shall describe the process of my invention when applied to the brine from Searles Lake which is saturated with sodium chlorid. In the preferred form of the process the brine is pumped from the lake in summer into a pond for evaporation and hanksite $9Na_2SO_4.2Na_2CO_3.KCl$ is crystallized out. In order to prevent supersaturation of the brine with hanksite and thereby preventing its crystallization, the brine should be agitated or some crystals of hanksite added in order to create equilibrium and to start the crystallization of the hanksite. Sodium chlorid will also crystallize out with the hanksite. Hanksite contains only a very small amount of potassium (about 4% KCl) and by sacrificing this small amount of potassium the brine becomes richer in potassium due to the removal of the large proportion of the sodium sulfate and carbonate ions and consequently permit the formation of a higher grade of potassium salts later in the process. The solution is evaporated until it becomes saturated with potassium sodium sulfate $K_4Na_2(SO_4)_3$ and at this point the solution is removed from the deposited crystals and transferred to another pond where evaporation continues and potassium sodium sulfate and sodium chlorid are crystallized out. Hanksite ceases to be formed as soon as potassium sodium sulfate begins to crystallize out and is therefore not deposited in the second pond. Evaporation of the solution in the second pond is continued until the solution becomes saturated with a carbonate salt, whereupon it is removed from the deposited crystals and transferred to another pond. In the third pond potassium sodium sulfate, sodium chlorid and a carbonate salt are crystallized out together. Where bicarbonates are present, as in Searles Lake, this carbonate salt is the sesqui-carbonate of sodium sometimes called trona. Evaporation is continued in the third pond until the solution becomes saturated with potassium chlorid and the solution is then removed from the deposited crystals and transferred to another pond in which it is cooled to crystallize out potassium chlorid. The solution is now rich in carbonates, and sodium carbonate will also crystallize out with the potassium chlorid as will also small amounts of sodium borate. The solution is then removed from the deposited crystals in this pond and the crystals are collected.

I claim:

1. The process of recovering potassium salts from liquors containing sodium, potassium, chlorid, sulfate and carbonate ions, which consists in evaporating the liquor to crystallize out hanksite, removing the liquor from the deposited crystals, evaporating the removed liquor to crystallize out potassium sodium sulfate, removing the liquor from the deposited crystals, evaporating the liquor to crystallize out potassium sodium sulfate and a carbonate salt, removing the liquor from the deposited crystals and cooling the liquor to crystallize out potassium chlorid.

2. The process of recovering potassium salts from liquors containing sodium, potassium, chlorid, sulfate and carbonate ions, which consists in evaporating the liquor to crystallize out hanksite and bring the liquor to saturation with potassium sodium sulfate, removing the liquor from the deposited crystals, evaporating the liquor to crystallize out potassium sodium sulfate and bring the liquor to saturation with a carbonate salt, removing the liquor from the deposited crystals, evaporating the liquor to crystallize out potassium sodium sulfate and a carbonate salt and bring the liquor to saturation with potassium chlorid, removing the liquor from the deposited crystals and cooling the liquor to crystallize out potassium chlorid.

3. The process of recovering potassium salts from liquors containing sodium, potassium, chlorid, sulfate and carbonate ions, which consists in evaporating the liquor to crystallize out hanksite, removing the liquor from the deposited crystals, evaporating the removed liquor to crystallize out potassium sodium sulfate, removing the liquor from the deposited crystals, and treating the removed liquor to produce the crystallization of potassium chlorid.

4. The process of recovering potassium salts from liquors containing sodium, potassium, chlorid, sulfate and carbonate ions, which consists in evaporating the liquor to crystallize out hanksite, removing the liquor from the deposited crystals, evaporating the removed liquor to crystallize out potassium sodium sulfate, removing the liquor from the deposited crystals, evaporating the liquor to crystallize out potassium sodium sulfate and a carbonate salt, removing the liquor from the deposited crystals, cooling the liquor to crystallize out potassium chlorid and sodium carbonate, removing the liquor from the deposited crystals and treating the deposited crystals to separate the sodium salts from the potassium salts.

5. The process of recovering potassium salts from liquors containing sodium, potassium, chlorid, sulfate and carbonate ions, which consists in evaporating the liquor to crystallize out hanksite, removing the liquor from the deposited crystals, evaporating the removed liquor to crystallize out potassium sodium sulfate, removing the liquor from the deposited crystals, evaporating the liquor to crystallize out potassium sodium sulfate and a carbonate salt, removing the liquor from the deposited crystals, cooling the liquor to crystallize out potassium chlorid and sodium carbonate, removing the liquor from the deposited crystals, dissolving the crystals, concentrating the solution, cooling the solution to crystallize out sodium carbonate, removing the solution from the deposited crystals and evaporating the solution to crystallize out potassium carbonate.

In testimony whereof I have hereunto set my hand at San Francisco, California, this 19th day of June, 1918.

GEORGE B. BURNHAM.

In presence of—
H. G. PROST.